United States Patent
Kim

(10) Patent No.: US 10,760,652 B2
(45) Date of Patent: Sep. 1, 2020

(54) AUTOMATIC TRANSMISSION FOR VEHICLE

(71) Applicant: HYUNDAI POWERTECH CO., LTD., Seosan-si, Chungcheongnam-do (KR)

(72) Inventor: Tae Hoon Kim, Hwaseong-si (KR)

(73) Assignee: HYUNDAI POWERTECH CO., LTD., Seosan-si, Chungcheongnam-do (KR)

( * ) Notice: Subject to any disclaimer, the term of this patent is extended or adjusted under 35 U.S.C. 154(b) by 92 days.

(21) Appl. No.: 15/748,073

(22) PCT Filed: Jul. 25, 2016

(86) PCT No.: PCT/KR2016/008102
§ 371 (c)(1),
(2) Date: Jan. 26, 2018

(87) PCT Pub. No.: WO2017/018763
PCT Pub. Date: Feb. 2, 2017

(65) Prior Publication Data
US 2018/0355953 A1    Dec. 13, 2018

(30) Foreign Application Priority Data
Jul. 27, 2015   (KR) .......................... 10-2015-0105995

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2046* (2013.01)
(58) Field of Classification Search
CPC ............... F16H 3/66; F16H 2200/0069; F16H 2200/2046; F16H 2200/2012
See application file for complete search history.

(56) References Cited

U.S. PATENT DOCUMENTS

| | | | |
|---|---|---|---|
| 2009/0023541 A1* | 1/2009 | Phillips | F16H 3/66 475/276 |
| 2009/0215580 A1* | 8/2009 | Hart | F16H 3/666 475/276 |

(Continued)

FOREIGN PATENT DOCUMENTS

| | | |
|---|---|---|
| DE | 10 2008 007 574 A1 | 8/2008 |
| JP | 2015-155719 A | 6/2005 |

(Continued)

OTHER PUBLICATIONS

International Search Report in International Application No. PCT/KR2016/008102, filed Jul. 25, 2016.

(Continued)

*Primary Examiner* — Stacey A Fluhart
(74) *Attorney, Agent, or Firm* — Saliwanchik, Lloyd & Eisenschenk

(57) ABSTRACT

An automatic transmission realizes forward 10-speed and reverse 1-speed shift stages by including an input shaft; a first planetary gear set; a second planetary gear set connected through one part and selectively connected through another part with the first planetary gear set, and receiving power from the input shaft; a third planetary gear set connected with the first planetary gear set through one part and selectively connected with the first planetary gear set through another part, and selectively connected with the second planetary gear set; a fourth planetary gear set selectively connected to a transmission housing, selectively connected with the first planetary gear set, selectively connected with the second planetary gear set, and connected with the third planetary gear set through one part and selectively connected with the third planetary gear set through another part; and an output shaft connected with the third planetary gear set, and outputting speed-shifted power.

5 Claims, 6 Drawing Sheets

(56) References Cited

U.S. PATENT DOCUMENTS

| | | | | |
|---|---|---|---|---|
| 2011/0294617 A1* | 12/2011 | Seo | ............... | F16H 3/666 |
| | | | | 475/275 |
| 2014/0106923 A1* | 4/2014 | Borgerson | ............ | F16H 3/66 |
| | | | | 475/275 |
| 2014/0179487 A1* | 6/2014 | Thomas | ............ | F16H 3/62 |
| | | | | 475/275 |
| 2014/0235399 A1* | 8/2014 | Goleski | ............ | F16H 3/62 |
| | | | | 475/275 |
| 2014/0378269 A1 | 12/2014 | Bockenstette et al. | | |
| 2015/0267782 A1* | 9/2015 | Beck | ............ | F16H 3/66 |
| | | | | 475/278 |
| 2015/0369342 A1* | 12/2015 | Kato | ............ | F16H 3/66 |
| | | | | 475/275 |
| 2016/0327129 A1* | 11/2016 | Lee | ............ | F16H 3/66 |

FOREIGN PATENT DOCUMENTS

| | | |
|---|---|---|
| JP | 2011-102616 A | 5/2011 |
| JP | 2011-220533 A | 11/2011 |
| JP | 2014-035057 A | 2/2014 |
| JP | 2014-199093 A | 10/2014 |
| KR | 10-2008-0033789 A | 4/2008 |
| KR | 10-1283034 B1 | 7/2013 |

OTHER PUBLICATIONS

Office Action dated Jun. 5, 2020 in German Application No. 112016003381.8, along with its English Machine Translation.

\* cited by examiner

FIG. 6

|      | B1 | B2 | CL1 | CL2 | CL3 | CL4 |
|------|----|----|-----|-----|-----|-----|
| 1st  |    | ●  | ●   |     |     | ●   |
| 2nd  |    | ●  |     |     | ●   | ●   |
| 3rd  |    | ●  | ●   |     | ●   |     |
| 4th  |    | ●  |     | ●   | ●   |     |
| 5th  |    | ●  | ●   | ●   |     |     |
| 6th  |    |    | ●   | ●   | ●   |     |
| 7th  | ●  |    | ●   | ●   |     |     |
| 8th  | ●  |    |     | ●   | ●   |     |
| 9th  | ●  |    | ●   |     | ●   |     |
| 10th | ●  |    |     |     | ●   | ●   |
| Rev  | ●  | ●  | ●   |     |     |     |

AUTOMATIC TRANSMISSION FOR VEHICLE

CROSS-REFERENCE TO RELATED APPLICATIONS

This application is the U.S. national stage application of International Patent Application No. PCT/KR2016/008102, filed Jul. 25, 2016, which claims priority to Korean Application No. 10-2015-0105995, filed Jul. 27, 2015, the disclosures of each of which are incorporated herein by reference in their entirety.

TECHNICAL FIELD

Embodiments of the present disclosure relate to an automatic transmission for a vehicle, and more particularly, to an automatic transmission for a vehicle which realizes forward 10-speed and reverse 1-speed shift stages by using four planetary gear sets, four clutches and two brakes.

BACKGROUND ART

Generally, an automatic transmission is realized by a combination of a plurality of planetary gear sets, and functions to transfer a rotational power transferred from a torque converter, to an output shaft, by automatically shifting a speed to multiple stages.

In the automatic transmission, the more shift stages are realized, the more appropriate transmission gear ratios may be designed and the more it is possible to realize a vehicle which is excellent in terms of power performance and fuel economy. Therefore, researches have been continuously conducted to realize an increased number of shift stages.

Even if the same shift stages are realized, the automatic transmission has a different operation mechanism depending on a connection scheme of rotation elements (a sun gear, a planetary carrier and a ring gear).

In the meantime, in the automatic transmission, while a plurality of shift stages are realized, an operating condition in which one friction member is released and another friction member is operated when making a shift to a neighboring shift stage should be satisfied from the viewpoint of transmission control.

A background art of the present disclosure is disclosed in Korean Unexamined Patent Publication No. 2008-0033789 (published on Apr. 17, 2008 and entitled "9-speed gear train of automatic transmission for vehicle").

DISCLOSURE

Technical Problem

Various embodiments are directed to an automatic transmission for a vehicle which realizes forward 10-speed and reverse 1-speed shift stages by using four planetary gear sets, four clutches and two brakes.

Technical Solution

In a first embodiment, an automatic transmission for a vehicle may include: an input shaft receiving power of an engine; a first planetary gear set; a second planetary gear set connected with the first planetary gear set through one part thereof and selectively connected with the first planetary gear set through another part thereof, and receiving power from the input shaft; a third planetary gear set connected with the first planetary gear set through one part thereof and selectively connected with the first planetary gear set through another part thereof, and selectively connected with the second planetary gear set; a fourth planetary gear set selectively connected to a transmission housing, selectively connected with the first planetary gear set, selectively connected with the second planetary gear set, and connected with the third planetary gear set through one part thereof and selectively connected with the third planetary gear set through another part thereof; and an output shaft connected with the third planetary gear set, and outputting speed-shifted power.

In a second embodiment, an automatic transmission for a vehicle may include: an input shaft receiving power of an engine; a first planetary gear set; a second planetary gear set always connected with the first planetary gear set, and receiving power from the input shaft; a third planetary gear set connected with the first planetary gear set through one part thereof and selectively connected with the first planetary gear set through another part thereof, and selectively connected with the second planetary gear set; a fourth planetary gear set selectively connected to a transmission housing, connected with the second planetary gear set through one part thereof and selectively connected with the second planetary gear set through another part thereof, and connected with the third planetary gear set through one part thereof and selectively connected with the third planetary gear set through another part thereof; and an output shaft connected with the third planetary gear set, and outputting speed-shifted power.

In a third embodiment, an automatic transmission for a vehicle may include: an input shaft receiving power of an engine; a first planetary gear set; a second planetary gear set connected with the first planetary gear set through one part thereof and selectively connected with the first planetary gear set through another part thereof, and receiving power from the input shaft; a third planetary gear set connected with the first planetary gear set through one part thereof and selectively connected with the first planetary gear set through another part thereof, and selectively connected with the second planetary gear set; a fourth planetary gear set selectively connected to a transmission housing, selectively connected with the first planetary gear set, connected with the second planetary gear set through one part thereof and selectively connected with the second planetary gear set through another part thereof, and connected with the third planetary gear set through one part thereof and selectively connected with the third planetary gear set through another part thereof; and an output shaft connected with the third planetary gear set, and outputting speed-shifted power.

In a fourth embodiment, an automatic transmission for a vehicle may include: an input shaft receiving power of an engine; a first planetary gear set; a second planetary gear set always connected with the first planetary gear set, and receiving power from the input shaft; a third planetary gear set connected with the first planetary gear set through one part thereof and selectively connected with the first planetary gear set through another part thereof, and connected with the second planetary gear set through one part thereof and selectively connected with the second planetary gear set through another part thereof; a fourth planetary gear set selectively connected to a transmission housing, connected with the second planetary gear set through one part thereof and selectively connected with the second planetary gear set through another part thereof, and connected with the third planetary gear set through one part thereof and selectively connected with the third planetary gear set through another part thereof; and an output shaft connected with the third planetary gear set, and outputting speed-shifted power.

In a fifth embodiment, an automatic transmission for a vehicle may include: an input shaft receiving power of an engine; a first planetary gear set; a second planetary gear set connected with the first planetary gear set through one part thereof and selectively connected with the first planetary gear set through another part thereof, and receiving power from the input shaft; a third planetary gear set connected with the first planetary gear set through one part thereof and selectively connected with the first planetary gear set through another part thereof; a fourth planetary gear set selectively connected to a transmission housing, always connected with the second planetary gear set, and connected with the third planetary gear set through one part thereof and selectively connected with the third planetary gear set through another part thereof; and an output shaft connected with the third planetary gear set, and outputting speed-shifted power.

Advantageous Effects

According to the embodiments of the present disclosure, the automatic transmission for a vehicle may realize forward 10-speed and reverse 1-speed shift stages by using four planetary gear sets, four clutches and two brakes.

DESCRIPTION OF DRAWINGS

FIG. 6 is an operation table illustrating respective shift stages of the automatic transmission for a vehicle in accordance with the embodiment of the present disclosure.

BEST MODE

Hereinafter, an automatic transmission for a vehicle will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
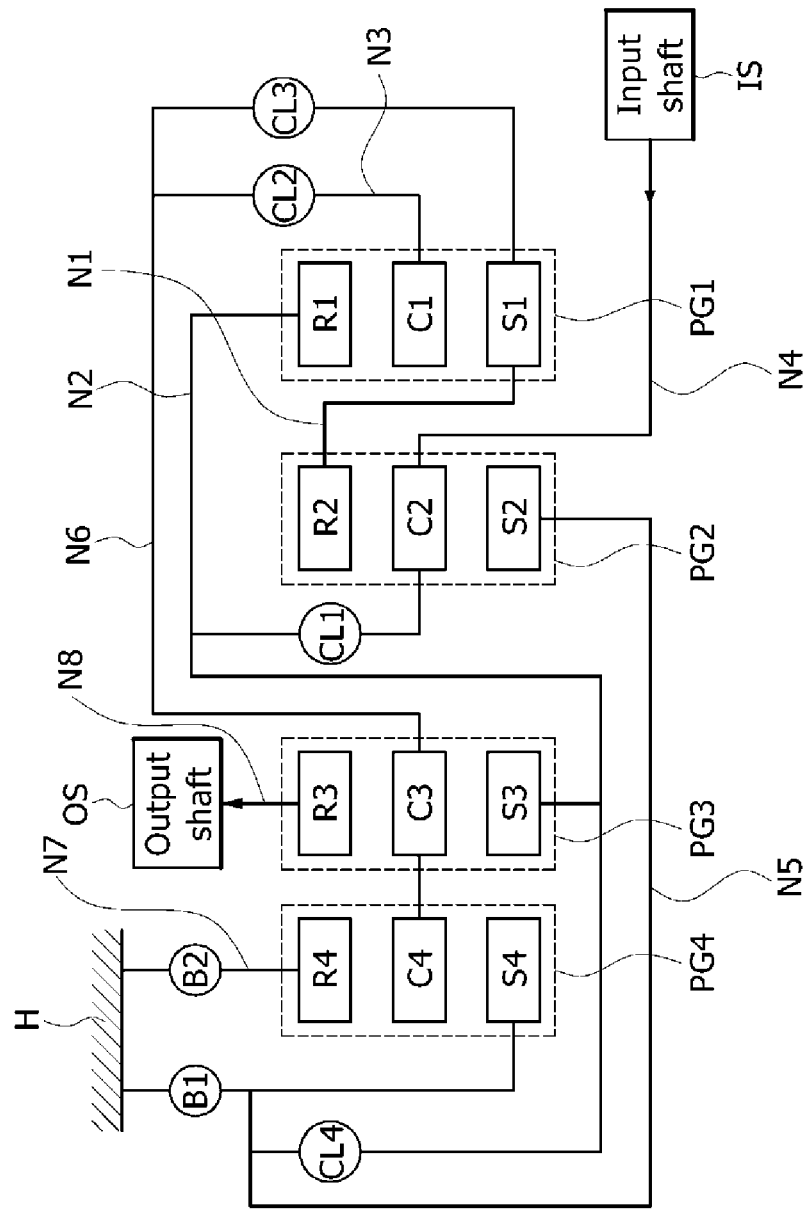
FIG. 1 is a construction diagram schematically illustrating an automatic transmission for a vehicle in accordance with a first embodiment of the present disclosure.

FIG. 1 is a construction diagram schematically illustrating an automatic transmission for a vehicle in accordance with a first embodiment of the present disclosure. Referring to FIG. 1, an automatic transmission for a vehicle 1 in accordance with a first embodiment of the present disclosure includes an input shaft IS, a first planetary gear set PG1, a second planetary gear set PG2, a third planetary gear set PG3, a fourth planetary gear set PG4, and an output shaft OS. According to this fact, the power inputted from the input shaft IS is outputted through the output shaft OS after being speed-shifted by the complementary operations of the first, second, third and fourth planetary gear sets PG1, PG2, PG3 and PG4.

Rotation power that is inputted from the crankshaft of an engine and is torque-converted through a torque converter is inputted to the input shaft IS as an input member. The output shaft OS as an output member transfers a driving force to drive driving wheels through a differential gear.

The second planetary gear set PG2 is connected with the first planetary gear set PG1 through one part thereof and is selectively connected with the first planetary gear set PG1 through another part thereof. The second planetary gear set PG2 is connected with the input shaft IS.

The third planetary gear set PG3 is connected with the first planetary gear set PG1 through one part thereof and is selectively connected with the first planetary gear set PG1 through another part thereof. The third planetary gear set PG3 is selectively connected with the second planetary gear set PG2. The output shaft OS is connected with the third planetary gear set PG3 and outputs speed-shifted power.

The fourth planetary gear set PG4 is selectively connected to a transmission housing H. The fourth planetary gear set PG4 is selectively connected with the first planetary gear set PG1, and is selectively connected with the second planetary gear set PG2. The fourth planetary gear set PG4 is connected with the third planetary gear set PG3 through one part thereof and is selectively connected with the third planetary gear set PG3 through another part thereof.

The first, second, third and fourth planetary gear sets PG1, PG2, PG3 and PG4 use single pinions. First, second, third and fourth clutches CL1, CL2, CL3 and CL4 are used to selectively connect the first, second, third and fourth planetary gear sets PG1, PG2, PG3 and PG4, and first and second brakes B1 and B2 are used to selectively connect the transmission housing H and the fourth planetary gear set PG4.

The first planetary gear set PG1 in accordance with the first embodiment of the present disclosure includes a first sun gear S1, a first ring gear R1 and a first carrier C1 which is engaged between the first sun gear S1 and the first ring gear R1.

The first sun gear S1 is always connected with the second planetary gear set PG2, and is selectively connected with the third planetary gear set PG3 through the third clutch CL3.

The first ring gear R1 is always connected with the third planetary gear set PG3, is selectively connected with the second planetary gear set PG2 through the first clutch CL1, and is selectively connected to the second planetary gear set PG2 and the fourth planetary gear set PG4 through the fourth clutch CL4.

The first carrier C1 is selectively connected with the third planetary gear set PG3 through the second clutch CL2. A single pinion is used as the first carrier C1.

The second planetary gear set PG2 in accordance with the first embodiment of the present disclosure includes a second sun gear S2, a second ring gear R2 and a second carrier C2 which is engaged between the second sun gear S2 and the second ring gear R2.

The second sun gear S2 is always connected with the fourth planetary gear set PG4. The second sun gear S2 is selectively connected to a rotation element between the first ring gear R1 and the third planetary gear set PG3 through the fourth clutch CL4. The second ring gear R2 is always connected with the first sun gear S1.

The second carrier C2 is connected with the input shaft IS. The second carrier C2 is selectively connected to the rotation element between the first ring gear R1 and the third planetary gear set PG3 through the first clutch CL1. A single pinion is used as the second carrier C2.

The third planetary gear set PG3 in accordance with the first embodiment of the present disclosure includes a third sun gear S3, a third ring gear R3 and a third carrier C3 which is engaged between the third sun gear S3 and the third ring gear R3.

The third sun gear S3 is always connected with the first ring gear R1. The third sun gear S3 is selectively connected with the second carrier C2 through the first clutch CL1. The third sun gear S3 is selectively connected to the fourth planetary gear set PG4 and the second sun gear S2 through the fourth clutch CL4. The third ring gear R3 is connected with the output shaft OS.

The third carrier C3 is always connected with the fourth planetary gear set PG4. The third carrier C3 is selectively connected with the first carrier C1 through the second clutch CL2, and is selectively connected with the first sun gear S1 through the third clutch CL3. A single pinion is used as the third carrier C3.

The fourth planetary gear set PG4 in accordance with the first embodiment of the present disclosure includes a fourth sun gear S4, a fourth ring gear R4 and a fourth carrier C4 which is engaged between the fourth sun gear S4 and the fourth ring gear R4.

The fourth sun gear S4 is selectively connected with the transmission housing H through the first brake B1. The fourth sun gear S4 is always connected with the second sun gear S2, and is selectively connected to a rotation element between the first ring gear R1 and the third sun gear S3 through the fourth clutch CL4. Due to this fact, the fourth sun gear S4 may be selectively connected to the first ring gear R1 and the third sun gear S3 through the fourth clutch CL4. The fourth sun gear S4 may be selectively connected with the second carrier C2 through the fourth clutch CL4 and the first clutch CL1.

The fourth ring gear R4 is selectively connected with the transmission housing H through the second brake B2. The fourth carrier C4 is always connected with the third carrier C3. A single pinion is used as the fourth carrier C4.

In the automatic transmission for a vehicle 1 in accordance with the first embodiment of the present disclosure, power is transferred by eight rotation elements.

A first rotation element N1 always connects one element of the first planetary gear set PG1 and one element of the second planetary gear set PG2. For instance, the first rotation element N1 may always connect the first sun gear S1 and the second ring gear R2.

A second rotation element N2 always connects one element of the first planetary gear set PG1 and one element of the third planetary gear set PG3. For instance, the second rotation element N2 may always connect the first ring gear R1 and the third sun gear S3.

A third rotation element N3 variably connects one element of the first planetary gear set PG1 and one element of the third planetary gear set PG3. For instance, the third rotation element N3 may selectively connect the first carrier C1 and the third carrier C3 through the second clutch CL2.

A fourth rotation element N4 always connects one element of the second planetary gear set PG2 and the input shaft IS, and is variably connected with the second rotation element N2. For instance, the fourth rotation element N4 may always connect the second carrier C2 and the input shaft IS, and may be selectively connected with the second rotation element N2 through the first clutch CL1.

A fifth rotation element N5 always connects one element of the second planetary gear set PG2 and one element of the fourth planetary gear set PG4, is variably connected with the second rotation element N2, and is variably connected to the transmission housing H. For instance, the fifth rotation element N5 may always connect the second sun gear S2 and the fourth sun gear S4, and may be selectively connected with the second rotation element N2 through the fourth clutch CL4. The fifth rotation element N5 may be selectively connected to the transmission housing H through the first brake B1.

A sixth rotation element N6 always connects one element of the third planetary gear set PG3 and one element of the fourth planetary gear set PG4, is variably connected with the first rotation element N1, and is variably connected with the third rotation element N3. For instance, the sixth rotation element N6 may always connect the third carrier C3 and the fourth carrier C4. The sixth rotation element N6 may be selectively connected with the first rotation element N1 through the third clutch CL3, and may be selectively connected with the third rotation element N3 through the second clutch CL2.

A seventh rotation element N7 variably connects one element of the fourth planetary gear set PG4 and the transmission housing H. For instance, the seventh rotation element N7 may selectively connect the fourth ring gear R4 to the transmission housing H through the second brake B2.

An eighth rotation element N8 always connects one element of the third planetary gear set PG3 and the output shaft OS. For instance, the eighth rotation element N8 may always connect the third ring gear R3 and the output shaft OS.

Figure 2:
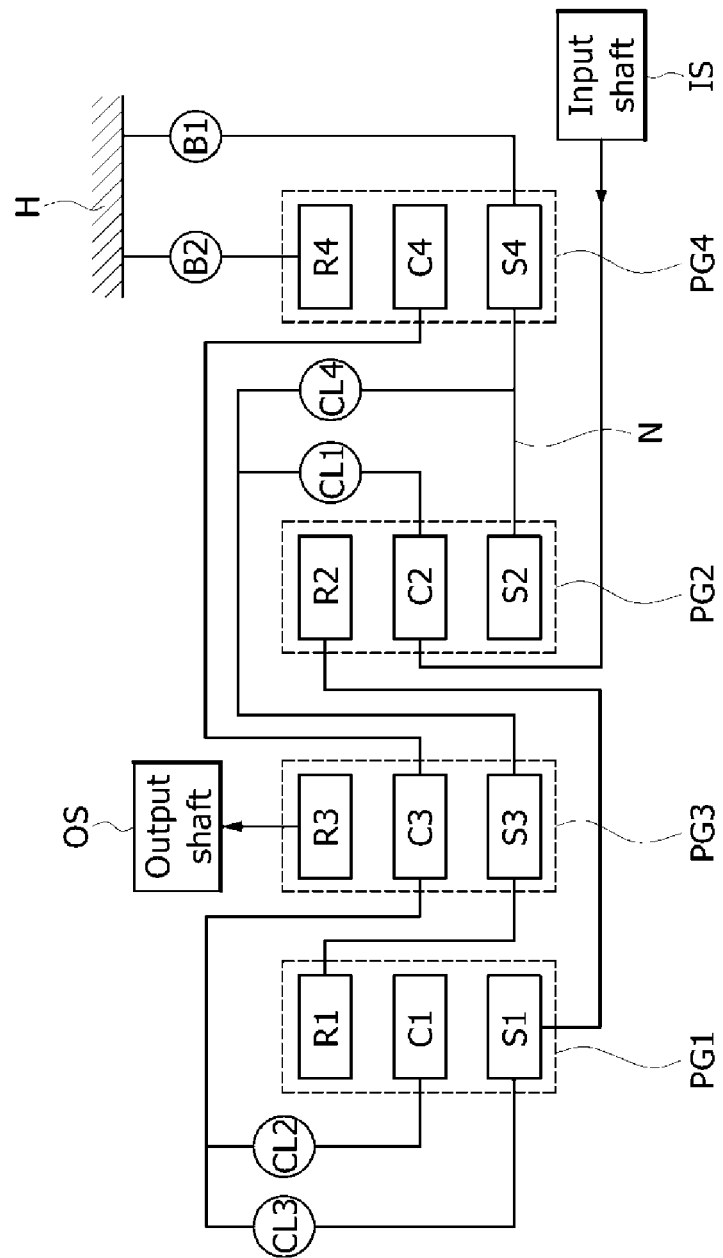
FIG. 2 is a construction diagram schematically illustrating an automatic transmission for a vehicle in accordance with a second embodiment of the present disclosure.

FIG. 2 is a construction diagram schematically illustrating an automatic transmission for a vehicle in accordance with a second embodiment of the present disclosure. Referring to FIG. 2, an automatic transmission for a vehicle 2 in accordance with a second embodiment of the present disclosure includes an input shaft IS, a first planetary gear set PG1, a second planetary gear set PG2, a third planetary gear set PG3, a fourth planetary gear set PG4, and an output shaft OS. According to this fact, the power inputted from the input shaft IS is outputted through the output shaft OS after being speed-shifted by the complementary operations of the first, second, third and fourth planetary gear sets PG1, PG2, PG3 and PG4.

Rotation power that is inputted from the crankshaft of an engine and is torque-converted through a torque converter is inputted to the input shaft IS as an input member. The output shaft OS as an output member transfers a driving force to drive driving wheels through a differential gear.

The second planetary gear set PG2 is always connected with the first planetary gear set PG1. The second planetary gear set PG2 is connected with the input shaft IS.

The third planetary gear set PG3 is connected with the first planetary gear set PG1 through one part thereof and is selectively connected with the first planetary gear set PG1 through another part thereof. The third planetary gear set PG3 is selectively connected with the second planetary gear set PG2. The output shaft OS is connected with the third planetary gear set PG3 and outputs speed-shifted power.

The fourth planetary gear set PG4 is selectively connected to a transmission housing H. The fourth planetary gear set PG4 is connected with the second planetary gear set PG2 through one part thereof and is selectively connected with the second planetary gear set PG2 through another part thereof. The fourth planetary gear set PG4 is connected with the third planetary gear set PG3 through one part thereof and is selectively connected with the third planetary gear set PG3 through another part thereof.

The first, second, third and fourth planetary gear sets PG1, PG2, PG3 and PG4 use single pinions. First, second, third and fourth clutches CL1, CL2, CL3 and CL4 are used to selectively connect the first, second, third and fourth planetary gear sets PG1, PG2, PG3 and PG4, and first and second brakes B1 and B2 are used to selectively connect the transmission housing H and the fourth planetary gear set PG4.

The first planetary gear set PG1 in accordance with the second embodiment of the present disclosure includes a first sun gear S1, a first ring gear R1 and a first carrier C1 which is engaged between the first sun gear S1 and the first ring gear R1.

The first sun gear S1 is always connected with the second planetary gear set PG2, and is selectively connected with the third planetary gear set PG3 through the third clutch CL3. The first ring gear R1 is always connected with the third planetary gear set PG3.

The first carrier C1 is selectively connected with the third planetary gear set PG3 through the second clutch CL2. A single pinion is used as the first carrier C1.

The second planetary gear set PG2 in accordance with the second embodiment of the present disclosure includes a second sun gear S2, a second ring gear R2 and a second carrier C2 which is engaged between the second sun gear S2 and the second ring gear R2.

The second sun gear S2 is always connected with the fourth planetary gear set PG4. The second sun gear S2 is selectively connected with the third planetary gear set PG3 through the fourth clutch CL4. The second ring gear R2 is always connected with the first sun gear S1.

The second carrier C2 is connected with the input shaft IS. The second carrier C2 is selectively connected with the third planetary gear set PG3 through the first clutch CL1. The third carrier C2 is selectively connected to a rotation element N between the second sun gear S2 and the fourth planetary gear set PG4 through the first clutch CL1 and the fourth clutch CL4. A single pinion is used as the second carrier C2.

The third planetary gear set PG3 in accordance with the second embodiment of the present disclosure includes a third sun gear S3, a third ring gear R3 and a third carrier C3 which is engaged between the third sun gear S3 and the third ring gear R3.

The third sun gear S3 is always connected with the first ring gear R1. The third sun gear S3 is selectively connected with the second carrier C2 through the first clutch CL1. The third sun gear S3 is selectively connected to the rotation element N between the second sun gear S2 and the fourth planetary gear set PG4 through the fourth clutch CL4. The third ring gear R3 is connected with the output shaft OS.

The third carrier C3 is always connected with the fourth planetary gear set PG4. The third carrier C3 is selectively connected with the first carrier C1 through the second clutch CL2, and is selectively connected with the first sun gear S1 through the third clutch CL3. A single pinion is used as the third carrier C3.

The fourth planetary gear set PG4 in accordance with the second embodiment of the present disclosure includes a fourth sun gear S4, a fourth ring gear R4 and a fourth carrier C4 which is engaged between the fourth sun gear S4 and the fourth ring gear R4.

The fourth sun gear S4 is selectively connected with the transmission housing H through the first brake B1. The fourth sun gear S4 is always connected with the second sun gear S2, and is selectively connected with the third sun gear S3 through the fourth clutch CL4. The fourth sun gear S4 is selectively connected with the second carrier C2 through the fourth clutch CL4 and the first clutch CL1.

The fourth ring gear R4 is selectively connected with the transmission housing H through the second brake B2. The fourth carrier C4 is always connected with the third carrier C3. A single pinion is used as the fourth carrier C4.

Figure 3:
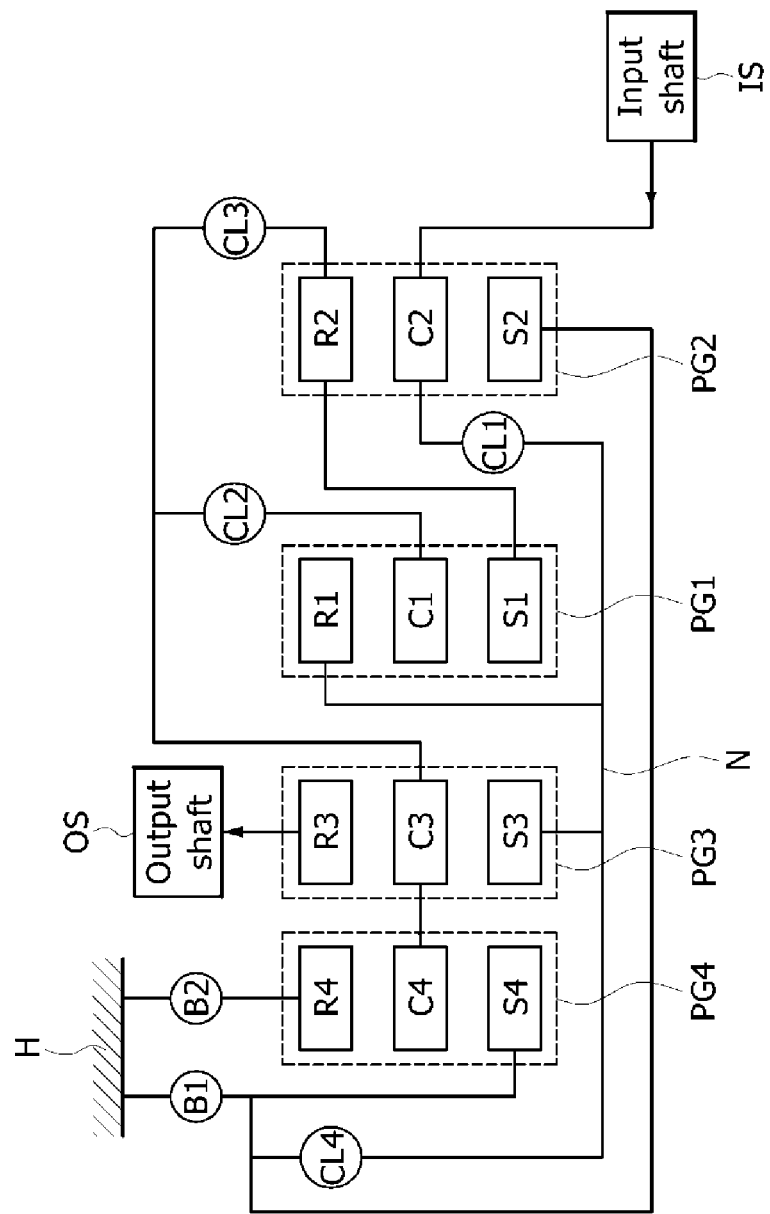
FIG. 3 is a construction diagram schematically illustrating an automatic transmission for a vehicle in accordance with a third embodiment of the present disclosure.

FIG. 3 is a construction diagram schematically illustrating an automatic transmission for a vehicle in accordance with a third embodiment of the present disclosure. Referring to FIG. 3, an automatic transmission for a vehicle 3 in accordance with a third embodiment of the present disclosure includes an input shaft IS, a first planetary gear set PG1, a second planetary gear set PG2, a third planetary gear set PG3, a fourth planetary gear set PG4, and an output shaft OS. According to this fact, the power inputted from the input shaft IS is outputted through the output shaft OS after being speed-shifted by the complementary operations of the first, second, third and fourth planetary gear sets PG1, PG2, PG3 and PG4.

Rotation power that is inputted from the crankshaft of an engine and is torque-converted through a torque converter is inputted to the input shaft IS as an input member. The output shaft OS as an output member transfers a driving force to drive driving wheels through a differential gear.

The second planetary gear set PG2 is connected with the first planetary gear set PG1 through one part thereof and is selectively connected with the first planetary gear set PG1 through another part thereof. The second planetary gear set PG2 is connected with the input shaft IS.

The third planetary gear set PG3 is connected with the first planetary gear set PG1 through one part thereof and is selectively connected with the first planetary gear set PG1 through another part thereof. The third planetary gear set PG3 is selectively connected with the second planetary gear set PG2. The output shaft OS is connected with the third planetary gear set PG3 and outputs speed-shifted power.

The fourth planetary gear set PG4 is selectively connected to a transmission housing H. The fourth planetary gear set PG4 is selectively connected with the first planetary gear set PG1, and is connected with the second planetary gear set PG2 through one part thereof and is selectively connected with the second planetary gear set PG2 through another part thereof. The fourth planetary gear set PG4 is connected with the third planetary gear set PG3 through one part thereof and is selectively connected with the third planetary gear set PG3 through another part thereof.

The first, second, third and fourth planetary gear sets PG1, PG2, PG3 and PG4 use single pinions. First, second, third and fourth clutches CL1, CL2, CL3 and CL4 are used to selectively connect the first, second, third and fourth planetary gear sets PG1, PG2, PG3 and PG4, and first and second brakes B1 and B2 are used to selectively connect the transmission housing H and the fourth planetary gear set PG4.

The first planetary gear set PG1 in accordance with the third embodiment of the present disclosure includes a first sun gear S1, a first ring gear R1 and a first carrier C1 which is engaged between the first sun gear S1 and the first ring gear R1.

The first sun gear S1 is always connected with the second planetary gear set PG2. The first ring gear R1 is always connected with the third planetary gear set PG3, is selectively connected with the second planetary gear set PG2 through the first clutch CL1, and is selectively connected to the second planetary gear set PG2 and the fourth planetary gear set PG4 through the fourth clutch CL4.

The first carrier C1 is selectively connected with the third planetary gear set PG3 through the second clutch CL2. The first carrier C1 is selectively connected with the second planetary gear set PG2 through the second clutch CL2 and the third clutch CL3. A single pinion is used as the first carrier C1.

The second planetary gear set PG2 in accordance with the third embodiment of the present disclosure includes a second sun gear S2, a second ring gear R2 and a second carrier C2 which is engaged between the second sun gear S2 and the second ring gear R2.

The second sun gear S2 is always connected with the fourth planetary gear set PG4. The second sun gear S2 is selectively connected to a rotation element N between the first ring gear R1 and the third planetary gear set PG3 through the fourth clutch CL4.

The second ring gear R2 is always connected with the first sun gear S1. The second ring gear R2 is selectively connected with the third planetary gear set PG3 through the third clutch CL3. The second ring gear R2 is selectively connected with the first carrier C1 through the third clutch CL3 and the second clutch CL2.

The second carrier C2 is connected with the input shaft IS. The second carrier C2 is selectively connected to the rotation element N between the first ring gear R1 and the third planetary gear set PG3 through the first clutch CL1. Due to this fact, the second carrier C2 may be selectively connected to the first ring gear R1 and the third planetary gear set PG3 through the first clutch CL1. The second carrier C2 may be selectively connected with the fourth planetary gear set PG4 through the first clutch CL1 and the fourth clutch CL4. A single pinion is used as the second carrier C2.

The third planetary gear set PG3 in accordance with the third embodiment of the present disclosure includes a third sun gear S3, a third ring gear R3 and a third carrier C3 which is engaged between the third sun gear S3 and the third ring gear R3.

The third sun gear S3 is always connected with the first ring gear R1. The third sun gear S3 is selectively connected with the second carrier C2 through the first clutch CL1. The third sun gear S3 is selectively connected to the fourth planetary gear set PG4 and the second sun gear S2 through the fourth clutch CL4. The third ring gear R3 is connected with the output shaft OS.

The third carrier C3 is always connected with the fourth planetary gear set PG4. The third carrier C3 is selectively connected with the first carrier C1 through the second clutch CL2, and is selectively connected with the second ring gear R2 through the third clutch CL3. A single pinion is used as the third carrier C3.

The fourth planetary gear set PG4 in accordance with the third embodiment of the present disclosure includes a fourth sun gear S4, a fourth ring gear R4 and a fourth carrier C4 which is engaged between the fourth sun gear S4 and the fourth ring gear R4.

The fourth sun gear S4 is selectively connected with the transmission housing H through the first brake B1. The fourth sun gear S4 is always connected with the second sun gear S2, and is selectively connected to the rotation element N between the first ring gear R1 and the third sun gear S3 through the fourth clutch CL4. Due to this fact, the fourth sun gear S4 may be selectively connected to the first ring gear R1 and the third sun gear S3 through the fourth clutch CL4. The fourth sun gear S4 may be selectively connected with the second carrier C2 through the fourth clutch CL4 and the first clutch CL1.

The fourth ring gear R4 is selectively connected with the transmission housing H through the second brake B2. The fourth carrier C4 is always connected with the third carrier C3. A single pinion is used as the fourth carrier C4.

Figure 4:
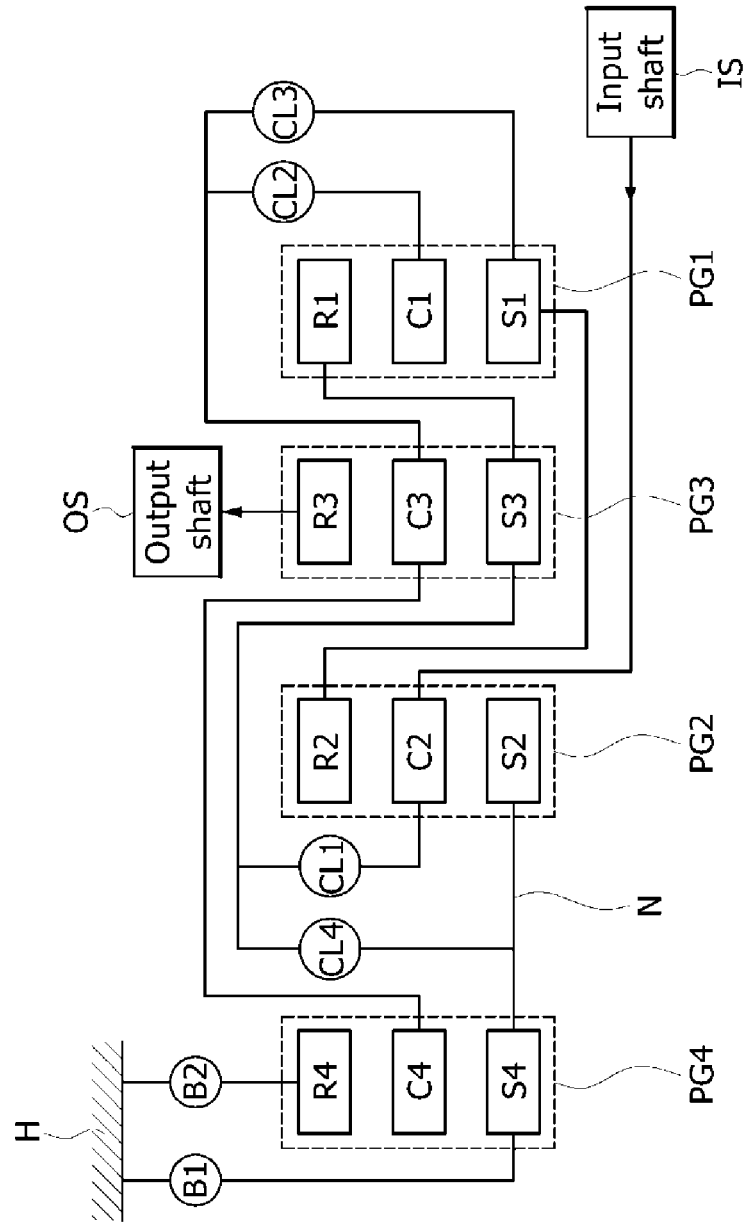
FIG. 4 is a construction diagram schematically illustrating an automatic transmission for a vehicle in accordance with a fourth embodiment of the present disclosure.

FIG. 4 is a construction diagram schematically illustrating an automatic transmission for a vehicle in accordance with a fourth embodiment of the present disclosure. Referring to FIG. 4, an automatic transmission for a vehicle 4 in accordance with a fourth embodiment of the present disclosure includes an input shaft IS, a first planetary gear set PG1, a second planetary gear set PG2, a third planetary gear set PG3, a fourth planetary gear set PG4, and an output shaft OS. According to this fact, the power inputted from the input shaft IS is outputted through the output shaft OS after being speed-shifted by the complementary operations of the first, second, third and fourth planetary gear sets PG1, PG2, PG3 and PG4.

Rotation power that is inputted from the crankshaft of an engine and is torque-converted through a torque converter is inputted to the input shaft IS as an input member. The output shaft OS as an output member transfers a driving force to drive driving wheels through a differential gear.

The second planetary gear set PG2 is always connected with the first planetary gear set PG1. The second planetary gear set PG2 is connected with the input shaft IS.

The third planetary gear set PG3 is connected with the first planetary gear set PG1 through one part thereof and is selectively connected with the first planetary gear set PG1 through another part thereof. The third planetary gear set PG3 is connected with the second planetary gear set PG2 through one part thereof and is selectively connected with the second planetary gear set PG2 through another part thereof. The output shaft OS is connected with the third planetary gear set PG3 and outputs speed-shifted power.

The fourth planetary gear set PG4 is selectively connected to a transmission housing H. The fourth planetary gear set PG4 is connected with the second planetary gear set PG2 through one part thereof and is selectively connected with the second planetary gear set PG2 through another part thereof. The fourth planetary gear set PG4 is connected with the third planetary gear set PG3 through one part thereof and is selectively connected with the third planetary gear set PG3 through another part thereof.

The first, second, third and fourth planetary gear sets PG1, PG2, PG3 and PG4 use single pinions. First, second, third and fourth clutches CL1, CL2, CL3 and CL4 are used to selectively connect the first, second, third and fourth planetary gear sets PG1, PG2, PG3 and PG4, and first and second brakes B1 and B2 are used to selectively connect the transmission housing H and the fourth planetary gear set PG4.

The first planetary gear set PG1 in accordance with the fourth embodiment of the present disclosure includes a first sun gear S1, a first ring gear R1 and a first carrier C1 which is engaged between the first sun gear S1 and the first ring gear R1.

The first sun gear S1 is always connected with the second planetary gear set PG2, and is selectively connected with the third planetary gear set PG3 through the third clutch CL3. The first ring gear R1 is always connected with the third planetary gear set PG3.

The first carrier C1 is selectively connected with the third planetary gear set PG3 through the second clutch CL2. A single pinion is used as the first carrier C1.

The second planetary gear set PG2 in accordance with the fourth embodiment of the present disclosure includes a second sun gear S2, a second ring gear R2 and a second carrier C2 which is engaged between the second sun gear S2 and the second ring gear R2.

The second sun gear S2 is always connected with the fourth planetary gear set PG4. The second sun gear S2 is selectively connected with the third planetary gear set PG3 through the fourth clutch CL4. The second ring gear R2 is always connected with the first sun gear S1.

The second carrier C2 is connected with the input shaft IS. The second carrier C2 is selectively connected with the third planetary gear set PG3 through the first clutch CL1. The second carrier C2 is selectively connected to a rotation element N between the second sun gear S2 and the fourth planetary gear set PG4 through the first clutch CL1 and the fourth clutch CL4. A single pinion is used as the second carrier C2.

The third planetary gear set PG3 in accordance with the fourth embodiment of the present disclosure includes a third sun gear S3, a third ring gear R3 and a third carrier C3 which is engaged between the third sun gear S3 and the third ring gear R3.

The third sun gear S3 is always connected with the first ring gear R1. The third sun gear S3 is selectively connected with the second carrier C2 through the first clutch CL1. The third sun gear S3 is selectively connected to the fourth planetary gear set PG4 and the second sun gear S2 through the fourth clutch CL4. The third ring gear R3 is connected with the output shaft OS.

The third carrier C3 is always connected with the fourth planetary gear set PG4. The third carrier C3 is selectively connected with the first carrier C1 through the second clutch CL2, and is selectively connected with the first sun gear S1 through the third clutch CL3. A single pinion is used as the third carrier C3.

The fourth planetary gear set PG4 in accordance with the fourth embodiment of the present disclosure includes a fourth sun gear S4, a fourth ring gear R4 and a fourth carrier C4 which is engaged between the fourth sun gear S4 and the fourth ring gear R4.

The fourth sun gear S4 is selectively connected with the transmission housing H through the first brake B1. The fourth sun gear S4 is always connected with the second sun gear S2, and is selectively connected with the third sun gear S3 through the fourth clutch CL4. The fourth sun gear S4 is selectively connected with the second carrier C2 through the fourth clutch CL4 and the first clutch CL1.

The fourth ring gear R4 is selectively connected with the transmission housing H through the second brake B2. The fourth carrier C4 is always connected with the third carrier C3. A single pinion is used as the fourth carrier C4.

Figure 5:
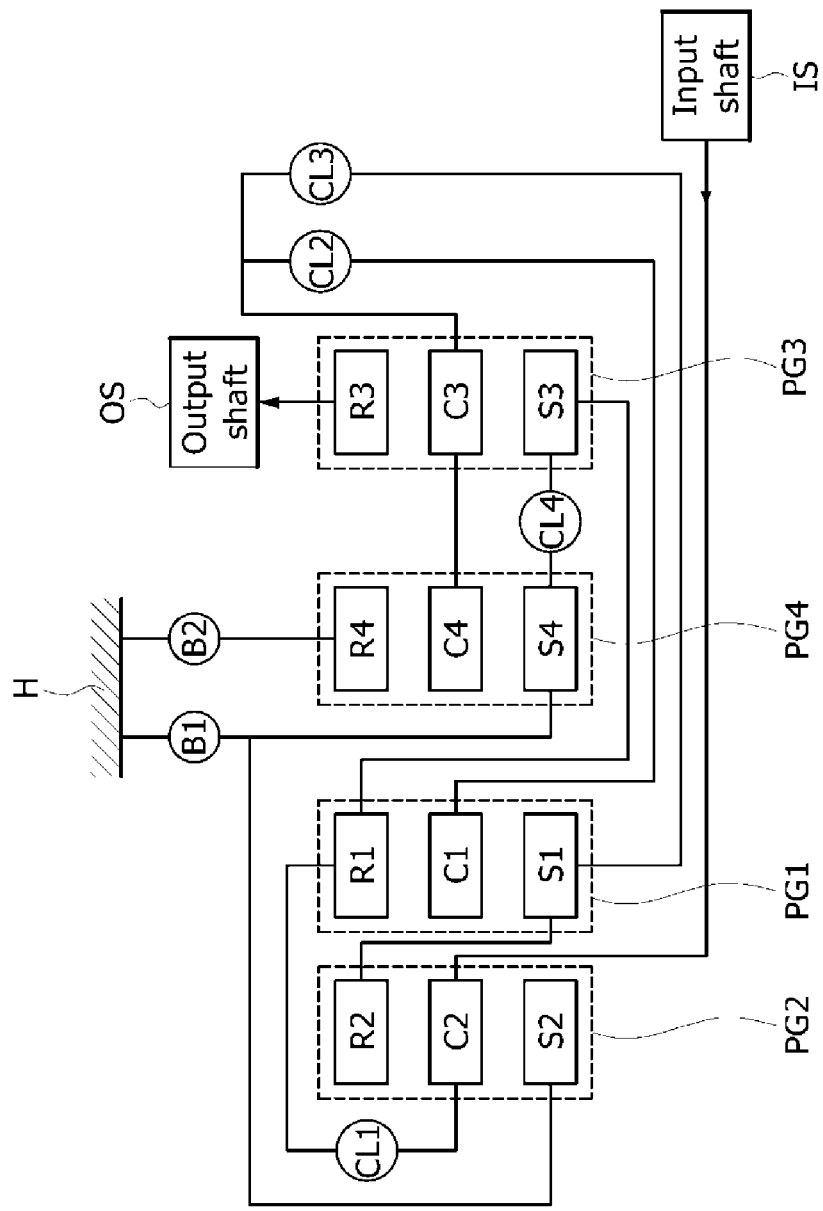
FIG. 5 is a construction diagram schematically illustrating an automatic transmission for a vehicle in accordance with a fifth embodiment of the present disclosure.

FIG. 5 is a construction diagram schematically illustrating an automatic transmission for a vehicle in accordance with a fifth embodiment of the present disclosure. Referring to FIG. 5, an automatic transmission for a vehicle 5 in accordance with a fifth embodiment of the present disclosure includes an input shaft IS, a first planetary gear set PG1, a second planetary gear set PG2, a third planetary gear set PG3, a fourth planetary gear set PG4, and an output shaft OS. According to this fact, the power inputted from the input shaft IS is outputted through the output shaft OS after being speed-shifted by the complementary operations of the first, second, third and fourth planetary gear sets PG1, PG2, PG3 and PG4.

Rotation power that is inputted from the crankshaft of an engine and is torque-converted through a torque converter is inputted to the input shaft IS as an input member. The output shaft OS as an output member transfers a driving force to drive driving wheels through a differential gear.

The second planetary gear set PG2 is connected with the first planetary gear set PG1 through one part thereof and is selectively connected with the first planetary gear set PG1 through another part thereof. The second planetary gear set PG2 is connected with the input shaft IS.

The third planetary gear set PG3 is connected with the first planetary gear set PG1 through one part thereof and is selectively connected with the first planetary gear set PG1 through another part thereof. The output shaft OS is connected with the third planetary gear set PG3 and outputs speed-shifted power.

The fourth planetary gear set PG4 is selectively connected to a transmission housing H. The fourth planetary gear set PG4 is always connected with the second planetary gear set PG2, and is connected with the third planetary gear set PG3 through one part thereof and is selectively connected with the third planetary gear set PG3 through another part thereof.

The first, second, third and fourth planetary gear sets PG1, PG2, PG3 and PG4 use single pinions. First, second, third and fourth clutches CL1, CL2, CL3 and CL4 are used to selectively connect the first, second, third and fourth planetary gear sets PG1, PG2, PG3 and PG4, and first and second brakes B1 and B2 are used to selectively connect the transmission housing H and the fourth planetary gear set PG4.

The first planetary gear set PG1 in accordance with the fifth embodiment of the present disclosure includes a first sun gear S1, a first ring gear R1 and a first carrier C1 which is engaged between the first sun gear S1 and the first ring gear R1.

The first sun gear S1 is always connected with the second planetary gear set PG2, and is selectively connected with the third planetary gear set PG3 through the third clutch CL3.

The first ring gear R1 is always connected with the third planetary gear set PG3, and is selectively connected with the second planetary gear set PG2 through the first clutch CL1.

The first carrier C1 is selectively connected with the third planetary gear set PG3 through the second clutch CL2. A single pinion is used as the first carrier C1.

The second planetary gear set PG2 in accordance with the fifth embodiment of the present disclosure includes a second sun gear S2, a second ring gear R2 and a second carrier C2 which is engaged between the second sun gear S2 and the second ring gear R2.

The second sun gear S2 is always connected with the fourth planetary gear set PG4. The second ring gear R2 is always connected with the first sun gear S1. The second carrier C2 is connected with the input shaft IS. The second carrier C2 is selectively connected with the first ring gear R1 through the first clutch CL1. A single pinion is used as the second carrier C2.

The third planetary gear set PG3 in accordance with the fifth embodiment of the present disclosure includes a third sun gear S3, a third ring gear R3 and a third carrier C3 which is engaged between the third sun gear S3 and the third ring gear R3.

The third sun gear S3 is always connected with the first ring gear R1. The third sun gear S3 is selectively connected with the fourth planetary gear set PG4 through the fourth clutch CL4. The third ring gear R3 is connected with the output shaft OS. The third carrier C3 is always connected with the fourth planetary gear set PG4. The third carrier C3 is selectively connected with the first carrier C1 through the second clutch CL2, and is selectively connected with the first sun gear S1 through the third clutch CL3. A single pinion is used as the third carrier C3.

The fourth planetary gear set PG4 in accordance with the fifth embodiment of the present disclosure includes a fourth sun gear S4, a fourth ring gear R4 and a fourth carrier C4 which is engaged between the fourth sun gear S4 and the fourth ring gear R4.

The fourth sun gear S4 is selectively connected with the transmission housing H through the first brake B1. The fourth sun gear S4 is always connected with the second sun gear S2, and is selectively connected with the third sun gear S3 through the fourth clutch CL4.

The fourth ring gear R4 is selectively connected with the transmission housing H through the second brake B2. The fourth carrier C4 is always connected with the third carrier C3. A single pinion is used as the fourth carrier C4.

FIG. 6 is an operation table illustrating respective shift stages of the automatic transmission for a vehicle in accordance with the embodiment of the present disclosure. Referring to FIGS. 1 to 6, in the automatic transmissions for a vehicle 1, 2, 3, 4 and 5 in accordance with the first, second, third, fourth and fifth embodiments, a speed shift is implemented as the first and second brakes B1 and B2 and the first, second, third and fourth clutches CL1, CL2, CL3 and CL4 selectively operate at each shift stage.

A reverse shift stage is realized as the first and second brakes B1 and B2 and the first clutch CL1 operate simultaneously. A forward first speed shift stage is realized as the second brake B2 and the first and fourth clutches CL1 and CL4 operate simultaneously. A forward second speed shift stage is realized as the second brake B2 and the third and fourth clutches CL3 and CL4 operate simultaneously. A forward third speed shift stage is realized as the second brake B2 and the first and third clutches CL1 and CL3 operate simultaneously. A forward fourth speed shift stage is realized as the second brake B2 and the second and third clutches CL2 and CL3 operate simultaneously. A forward fifth speed shift stage is realized as the second brake B2 and the first and second clutches CL1 and CL2 operate simultaneously. A forward sixth speed shift stage is realized as the first, second and third clutches CL1, CL2 and CL3 operate simultaneously. A forward seventh speed shift stage is realized as the first brake B1 and the first and second clutches CL1 and CL2 operate simultaneously. A forward eighth speed shift stage is realized as the first brake B1 and the second and third clutches CL2 and CL3 operate simultaneously. A forward ninth speed shift stage is realized as the first brake B1 and the first and third clutches CL1 and CL3 operate simultaneously. A forward tenth speed shift stage is realized as the first brake B1 and the third and fourth clutches CL3 and CL4 operate simultaneously.

The automatic transmission for a vehicle 1 in accordance with the embodiment may realize forward 10-speed and reverse 1-speed shift stages by combining the first, second, third and fourth planetary gear sets PG1, PG2, PG3 and PG4, the first, second, third and fourth clutches C1, C2, C3 and C4 and the first and second brakes B1 and B2.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

The invention claimed is:

1. An automatic transmission for a vehicle, realizing multiple shift stages by including:

a first planetary gear set;
a second planetary gear set connected with the first planetary gear set through one part thereof and selectively connected with the first planetary gear set through another part thereof, and connected with an input shaft;
a third planetary gear set connected with the first planetary gear set through one part thereof and selectively connected with the first planetary gear set through another part thereof, selectively connected with the second planetary gear set, and transferring speed-shifted power to an output shaft; and
a fourth planetary gear set selectively connected to a transmission housing, selectively connected with the first planetary gear set, selectively connected with the second planetary gear set, and connected with the third planetary gear set through one part thereof and selectively connected with the third planetary gear set through another part thereof,
wherein each of the first planetary gear set, the second planetary gear set, the third planetary gear set, and the fourth planetary gear set is a single pinion, and
wherein the first planetary gear set comprises:
a first sun gear connected with the second planetary gear set, and selectively connected with the third planetary gear set through a third clutch;
a first ring gear connected with the third planetary gear set, selectively connected with the second planetary gear set through a first clutch, and selectively connected with the second planetary gear set and the fourth planetary gear set through a fourth clutch; and
a first carrier disposed between the first sun gear and the first ring gear, and selectively connected with the third planetary gear set through a second clutch.

2. The automatic transmission according to claim 1, wherein the second planetary gear set comprises:
a second sun gear connected with the fourth planetary gear set, and selectively connected to a rotation element between the first ring gear and the third planetary gear set through the fourth clutch;
a second ring gear connected with the first sun gear; and
a second carrier disposed between the second sun gear and the second ring gear, connected with the input shaft, and selectively connected to the rotation element between the first ring gear and the third planetary gear set through the first clutch.

3. The automatic transmission according to claim 2, wherein the third planetary gear set comprises:
a third sun gear connected with the first ring gear, selectively connected with the second carrier through the first clutch, and selectively connected to the fourth planetary gear set and the second sun gear through the fourth clutch;
a third ring gear connected with the output shaft; and
a third carrier disposed between the third sun gear and the third ring gear, connected with the fourth planetary gear set, selectively connected with the first carrier through the second clutch, and selectively connected with the first sun gear through the third clutch.

4. The automatic transmission according to claim 3, wherein the fourth planetary gear set comprises:
a fourth sun gear selectively connected with the transmission housing through a first brake, connected with the second sun gear, and selectively connected to the rotation element between the first ring gear and the third sun gear through the fourth clutch;

a fourth ring gear selectively connected with the transmission housing through a second brake; and a fourth carrier disposed between the fourth sun gear and the fourth ring gear, and connected with the third carrier.

5. The automatic transmission according to claim 4, wherein the multiple shift stages comprise:

a reverse shift stage realized as the first brake, the second brake, and the first clutch operate simultaneously;

a forward first speed shift stage realized as the second brake, the first clutch, and the fourth clutch operate simultaneously;

a forward second speed shift stage realized as the second brake, the third clutch, and the fourth clutch operate simultaneously;

a forward third speed shift stage realized as the second brake, the first clutch, and the third clutch operate simultaneously;

a forward fourth speed shift stage realized as the second brake, the second clutch, and the third clutch operate simultaneously;

a forward fifth speed shift stage realized as the second brake, the first clutch, and the second clutch operate simultaneously;

a forward sixth speed shift stage realized as the first clutch, the second clutch, and the third clutch operate simultaneously;

a forward seventh speed shift stage realized as the first brake, the first clutch, and the second clutch operate simultaneously;

a forward eighth speed shift stage realized as the first brake, the second clutch, and the third clutch operate simultaneously;

a forward ninth speed shift stage realized as the first brake, the first clutch, and the third clutch operate simultaneously; and a forward tenth speed shift stage realized as the first brake, the third clutch, and the fourth clutch operate simultaneously.

* * * * *